United States Patent [19]
Kammer et al.

[11] 3,787,658
[45] Jan. 22, 1974

[54] TUBULAR ARC WELDING ELECTRODE

[75] Inventors: Paul A. Kammer, Springettsbury Township, York County; Robert B. Duttera, Springfield Township, York County, Pa.

[73] Assignee: Teledyne, Inc., Los Angeles, Calif.

[22] Filed: Nov. 3, 1971

[21] Appl. No.: 195,486

[52] U.S. Cl................... 219/146, 117/202, 219/137
[51] Int. Cl.............................................. B23k 35/22
[58] Field of Search.................... 219/146, 145, 137; 117/202–206

[56] References Cited
UNITED STATES PATENTS

| | | | |
|---|---|---|---|
| 3,585,352 | 6/1971 | Zvanut | 219/146 |
| 3,670,135 | 6/1972 | Zvanut | 219/146 |
| 3,643,061 | 2/1972 | Duttera et al | 219/146 |
| 3,177,340 | 4/1965 | Danhier | 219/146 |
| 3,488,469 | 1/1970 | Buss | 219/146 |
| 3,539,765 | 11/1970 | Duttera | 219/146 |
| 3,573,426 | 4/1971 | Blake et al | 219/146 |
| 3,424,892 | 1/1969 | Wilcox | 219/146 |
| 3,461,270 | 8/1969 | Patton | 219/146 |
| 2,909,778 | 10/1959 | Landis et al. | 219/146 |

*Primary Examiner*—Thomas J. Kozma
*Assistant Examiner*—George A. Montanye
*Attorney, Agent, or Firm*—Edward Hoopes, III

[57] ABSTRACT

A bare continuous tubular electrode consisting of a metallic outer sheath and a core within and enclosed by the sheath, the electrode consisting essentially of, by weight: 0.05 to 0.36 per cent. of at least one fluxing agent selected from the group consisting of lithium fluoride, cryolite, potassium silicofluoride and sodium silicofluoride; 0.01 to 1.8 per cent. in total of slag former selected from the group consisting of titanium dioxide, potassium permanganate, sodium feldspar, zirconium silicate, calcium silicate, magnesium oxide, manganese oxide and calcium carbonate, but no more than 1.2 per cent. of any individual slag former; 0 to 0.012 per cent. of arc stabilizer comprising potassium titanate; the balance of the electrode being metal-bearing material; said metal-bearing material containing, by weight of the electrode, 1.5 to about 10 per cent. alloying ingredients and deoxidizer, said alloying ingredients and deoxidizer comprising 0.6 to 1.8 per cent. manganese and 0.25 to 0.9 per cent. silicon, the balance of the metal-bearing material being essentially iron. The fluxing agent desirably comprises 0.12 per cent. cryolite and the slag former desirably includes titanium dioxide, sodium feldspar, zirconium silicate and calcium silicate. The electrode preferably contains up to 0.2 per cent. carbon, 0 to 4 per cent. nickel, 0 to 6 per cent. chromium and 0 to 1.3 per cent. molybdenum. The fluxing agent may be selected from lithium fluoride, potassium silicofluoride and sodium silicofluoride and the slag former may comprise 0.024 per cent. calcium carbonate while the electrode may contain up to 0.2 per cent. carbon, 0 to 4 per cent. nickel, 0 to 6 per cent. chromium and 0 to 1.3 per cent. molybdenum.

5 Claims, No Drawings

TUBULAR ARC WELDING ELECTRODE

This invention relates to bare continuous tubular arc welding electrodes, in which a metal sheath encloses a core of suitable materials. More particularly it relates to such electrodes especially suitable for producing ferrous weld deposits when employed as the consumable electrode in a short-circuiting arc welding process.

The short-circuiting arc process, disclosed for example in U. S. Pat. No. 2,886,696, is a method of semi-automatic or automatic arc welding in which a continuous consumable electrode is fed toward a workpiece and welding current is supplied through an inductive circuit to the workpiece and to the electrode at a potential to cause the electrode to alternately arc and short circuit with the work at a short circuit repetition rate such that substantially all metal transfer from the electrode to the workpiece occurs during the short circuits. The process generally employs low current density and small diameter continuous ferrous electrodes - i.e., 1/16 inch diameter and smaller. The arc is normally shielded with an externally supplied shielding gas such as $CO_2$, 75 per cent. argon-25 per cent. $CO_2$ or 90 per cent. helium-7.5 per cent. argon-2.5 per cent. $CO_2$, for example. Short-circuiting arc welding has become very popular since it is useful in out-of-position applications — i.e., overhead and vertical — by virtue of the fact that the relatively cold molten puddle is easy to control and does not run out of the joint.

Short-circuiting arc welding has been utilized in welding mild steel and to a lesser extent in welding low-alloy steels, tool steels and austenitic stainless steels. In these applications solid wire electrodes and tubular electrodes containing only metallic ingredients in the core in 0.035- and 0.045-inch diameters have been used virtually exclusively although such electrodes have several disadvantages in the short-circuiting arc process. Because of the welding characteristics of most such electrodes there is a propensity for the formation of cold shuts, areas in which the weld metal does not fuse to previously deposited metal or the base plate; overcoming this problem requires a high degree of welder's skill in manipulating the welding gun. Further, in depositing root passes in many applications the welder is limited to 0.035-inch maximum wire diameter to avoid the burn-through often encountered at optimum welding currents for larger diameter wire. Finally, solid wires of any type other than common mild steel are generally relatively expensive in the small diameters used in short-circuiting arc welding.

There have been very few attempts to use tubular electrodes containing nonmetallic (e.g. fluxing) core ingredients in the short-circuiting arc process. Although many of the existing tubular electrodes for other gas-shielded processes will provide commercially acceptable weld metal when welded downhand or in the flat position, they generally require too much heat input to be used out of position in standard diameters such as 7/64 inch and 3/32 inch. Attempts to reduce the diameter of such prior tubular electrodes to lower their heat input requirements and thereby enable them to be used in the short-circuiting arc process for out-of-position work still does not provide a satisfactory product because even though weld metal properties can sometimes be maintained, the operator appeal deteriorates — i.e., the spatter level becomes excessive and the relatively high volume of slag associated with such electrodes tends to interfere with arc action and become trapped in the weld metal, resulting in unacceptable deposit soundness. Thus, although tubular electrodes enjoy a distinct economic advantage and improved versatility of composition over solid wire, especially in the low-alloy steel, tool steel and austenitic stainless steel grades, those containing non-metallic core components have not heretofore been suitable for short-circuiting arc welding, where the demand for welding consumables has been increasing due to increasing use of the process.

Low alloy steels, because of their high strength and excellent toughness and relatively low cost, are finding increasing use in applications such as pipe lines, in the fabrication of which a great deal of out-of-position welding is required. As a result, increasing interest has been generated in the use of the short-circuiting arc process because of its savings in time and cost as compared to manual covered electrode welding. However, because of the above mentioned difficulties with previously available wires of the low-alloy types, several fabricators have prohibited use of the short-circuiting arc technique with such wires. This situation further accentuates the need for a low cost continuous electrode especially adapted for short-circuiting arc welding, particularly for low-alloy steels.

By low-alloy steels is meant steels containing up to about 10 per cent by weight of one or more of the common alloy ingredients such as molybdenum, chromium, nickel and manganese, including up to about 0.2 per cent carbon; small quantities of additional alloy ingredients such as cobalt, copper, vanadium, columbium and tungsten are also occasionally present for special purposes. Tool steels may contain up to about 25 per cent of such alloy ingredients, including up to about 2.5 per cent carbon.

We provide a bare continuous tubular electrode for use in the short-circuiting arc welding process which is free of the above mentioned difficulties possessed by both solid wires and previous tubular wires and has additional advantages over the wires previously available for this type of welding. As compared to solid wire, our novel electrode deposits metal with superior wetting characteristics in the short-circuiting arc process so that less operator skill is required to deposit sound, inclusion-free weld metal. Further, whereas for certain root passes 0.035-inch diameter solid wire is the largest size that can be used because of problems with bead contour and excessive penetration, our electrode can be used quite satisfactorily in 0.045-inch diameter for such root passes in all positions with excellent bead contour and no excess penetration problems. As compared to tubular electrodes of the prior art which have been unsatisfactory in the short-circuiting arc process, our electrode is characterized by a novel balance of nonmetallic and metallic constituents which we have found to provide superior operator appeal and weld metal contour and soundness, coupled with satisfactory weld metal properties and a slag of desirably low volume but of such characteristics as to minimize or completely prevent inclusions in the weld deposit.

In certain respects, use of our electrode can be considered an improvement in a method of producing a ferrous weld deposit by the above described short-circuiting arc process.

In accordance with the invention we provide a bare continuous tubular electrode for use in a short-circuiting arc welding process consisting of a metallic outer sheath and a core within and enclosed by the sheath, the electrode containing, by weight:

0.05 to 2.5 per cent of at least one fluxing agent selected from the group consisting of fluorides of lithium, sodium, calcium, barium and the rare earth metals, silicofluorides of potassium and sodium, cryolite and potassium titanium fluoride;

0.01 to 2 per cent of at least one slag former selected from the group consisting of titanium dioxide, silicon dioxide, potassium permanganate, sodium feldspar, potassium feldspar, silicates of sodium, potassium, zirconium, calcium and magnesium, oxides of magnesium, chromium and manganese and carbonates of calcium, lithium, barium, strontium, and magnesium;

but no more than 1.2 per cent of any individual fluxing agent or slag former;

0 to 1 per cent of arc stabilizer selected from the group consisting of potassium titanate, sodium titanate, potassium-bearing frit and sodium-bearing frit;

the balance of the electrode being metal-bearing material in amount sufficient to form a mild steel, low-alloy steel or tool steel weld deposit containing at least 0.6 per cent manganese;

said metal-bearing material containing, by weight of the electrode, up to about 25 per cent alloying ingredients and deoxidizer comprising at least 0.6 per cent manganese and at least .25 per cent silicon, the balance of the metal-bearing material being essentially iron.

Other details, objects and advantages of the invention will become apparent as the following description of certain present preferred embodiments thereof and a present preferred method of practicing the same proceeds.

The core of our electrode may constitute any convenient percentage of the total electrode weight as long as the electrode as a whole contains the required constituents. The metal bearing material, as will be appreciated by those skilled in the art, includes the sheath metal as well as metal powders in the core and comprises iron, alloy ingredients and deoxidizer metals in amounts sufficient to produce the desired weld deposit.

Electrode deoxidizer metals reduce the oxygen and in some cases also the nitrogen content of the weld metal by combining with these elements to form oxides and nitrides which go primarily into the slag. Common deoxidizing metals include silicon, manganese, aluminum, titanium and zirconium, and our electrode preferably includes a content of at least 0.6 per cent manganese and at least 0.25 per cent silicon; these amounts are particularly preferred when the electrode is designed to produce as low-alloy steel weld deposit. Magnesium, calcium and lithium are also deoxidizer metals which have the added property of acting as deposit toughening agents as is later discussed. It should be pointed out that if aluminum, titanium or zirconium are used as deoxidizers in amounts sufficient to result in some non-oxidized metal which acts as alloy in the weld deposit, the amount of each acting as alloy should not exceed about 0.05 per cent of the deposit weight because, as is known to those skilled in the art, amounts in excess of this can impair deposit toughness. Because of the careful control thus required with aluminum, titanium and zirconium, these metals are not generally used as deoxidizers where optimum deposit toughness is desired.

Fluxing agent is fluorine containing material which promotes homogeneous slag and regulates slag fluidity, thereby affecting slag coverage and removal and weld metal contour and tie-in. The examples of fluxing agent listed above may be present either as prepared chemical compounds or as the natural mineral equivalents thereof — e.g., calcium fluoride may be, and usually is, present as the mineral fluorspar.

Slag former generally is used to adjust the bulk of the welding slag. In some of the embodiments of our electrode such material constitutes the major portion of the ingredients forming the slag and as such exerts a strong influence on bead appearance and contour; however, in the preferred embodiments of our electrode slag former may be present in minor quantities, in which case its influence is more in stabilizing the arc than on bead appearance and contour. Again the listed examples of slag former may be present as chemical compounds or as the mineral equivalents — for example, $TiO_2$ may be present as the mineral rutile. It should also be pointed out that the listed silicates of sodium and potassium are understood to be in forms essentially free of water, as will be appreciated by those skilled in the art.

As indicated above, no individual non-metallic core component should exceed 1.2 per cent of the electrode weight; we have found that if any such component is present in weight percentage above this limit the short-circuiting arc characteristics begin to deteriorate, e.g., transfer becomes somewhat erratic, spatter increases and slag trapping increases, all of which effects are undesirable.

Arc stabilizer reduces spatter and irregularities in the transfer of molten metal across the welding arc. In addition to the examples of arc stabilizer set forth above, a source of lithium ions helps to stabilize the arc, as is later discussed.

The various non-metallic components may serve in more than one capacity in some welding systems; the above categorization classifies them in the groups in which they are felt to operate most frequently. For example, potassium silicofluoride is listed as an example of a fluxing agent but in our electrode this material may act as both a fluxing agent and an arc stabilizer. Similarly, potassium silicate acts as both a slag former and an arc stabilizer in our electrode.

Deposit impact toughening agents include metallic magnesium, use of which is disclosed in U. S. Pat. No. 3,539,765; under certain conditions metallic calcium and metallic lithium may also be effective as toughening agents. However, handling of metallic calcium or lithium, even when either metal is alloyed with other less active metals, is more difficult than handling metallic magnesium, and calcium and lithium are considerably more expensive than magnesium; further, such handleable forms of calcium and lithium as are available present problems because of the presence of carbon and aluminum respectively, and therefore we prefer to use magnesium as a toughening agent. It should be pointed out that using toughening agent may in some instances require special care in balancing the core composition in order to maintain optimum operator appeal.

Our bare continuous tubular electrode preferably contains up to about 25 per cent alloying ingredients other than iron, including deoxidizer comprising at least 0.6 per cent manganese and at least 0.25 per cent silicon, the total alloy content being sufficient to form a mild steel, low-alloy steel or tool steel weld deposit containing at least 0.6 per cent manganese. Balancing the metallic content of the electrode to secure a desired deposit analysis is a practice well known to those skilled in the art and is based on a knowledge of the losses of specific alloy or deoxidizing metals which occur in crossing the arc, which losses vary with the particular alloy and slag system employed. In our preferred electrode we balance the metal-bearing core ingredients so that chemical analysis of the deposited weld metal shows at least 0.6 per cent manganese.

In one preferred embodiment of our electrode the fluxing agent is cryolite in amount up to 0.5 per cent and the slag former is selected from $TiO_2$, sodium feldspar, zirconium silicate (which may be present either as the prepared compound or as zircon sand), calcium silicate (normally present as wollastonite) and magnesium oxide.

In another preferred embodiment our electrode contains 0.05 to 1 per cent of fluxing agent selected from lithium fluoride, potassium silicofluoride and sodium silicofluoride, 0.025 to 0.5 per cent of slag former comprising calcium carbonate, 0 to 0.5 per cent of slag former selected from oxide of manganese and potassium permanganate and 0 to 0.3 per cent arc stabilizer comprising potassium titanate.

Fabrication of our improved bare continuous tubular electrode may be accomplished by any of several commonly known methods. The object of any such method is to enclose a core of chosen materials, generally in finely divided form, in a suitable metal sheath in such a way that none of the core material can be lost and that incursion of air or moisture into the core is minimized or prevented. Selection of core materials, in addition to being based on the desired slag system, operational characteristics and weld deposit chemistry, takes into account objectives such as low moisture content and rehydration rate and similar aims recognized by those skilled in the art. Sheath metal is selected primarily on the basis of its formability and its contribution to overall electrode deposit chemistry; good formability is necessary in order to fabricate the tube and the sheath normally contributes the major portion of the deposit chemistry. Our new electrode preferably employs a mild steel sheath enclosing a core containing the necessary non-metallic and metallic materials in powder form.

The metallic contents of our electrode are normally obtained both from the sheath material, as above indicated, and from common powdered metals and alloys, e.g., ferrosilicon and electrolytic manganese, added to the core. As is known to those skilled in the art, other core materials may be used to aid in securing the necessary metallic contents of the electrode; for example, it is possible for a powdered metal-bearing material to appear in the electrode core in non-metallic form such as an oxide if the form is readily reducible under the welding conditions. Since the deposits produced by our preferred electrodes for low-alloy steels require a carbon content of less than 0.2 per cent and in some very low carbon grades less than 0.05 per cent, sources of carbon in these electrodes, especially metallic components containing carbon, must be controlled. Control must also be exercised over compounds which can provide carbon through reduction in the arc, such as carbonates. Limitations along these lines are well known to those skilled in the art. Normally carbon content is kept as low as is economically feasible, but less expensive ferro-alloys or sheath material containing somewhat greater than residual amounts of carbon may be used for reasons of economy when tolerable.

For producing mild steel deposits our electrode contains up to 0.12 per cent carbon, from 1 to 2.5 per cent manganese and from 0.4 to 1 per cent silicon.

For producing low-alloy steel deposits our electrode contains up to 0.2 per cent carbon, 0.6 to 3 per cent manganese, 0.25 to 1 per cent silicon, 0 to 4 per cent nickel, 0 to 6 per cent chromium and 0 to 1.3 per cent molybdenum, the sum of per cent manganese plus per cent silicon plus per cent nickel plus per cent chromium plus per cent molybdenum being at least 1.5 per cent, the balance of the metallic content of the electrode consisting essentially of iron. This electrode may also contain 0.1 to 0.7 per cent metallic magnesium as a deposit toughening agent.

For producing tool steel deposits of various standard types, our electrode contains alloying ingredients as listed in the following table.

| Tool Steel Deposit Type | Per Cent. Alloy in Electrode | | | | | | | | |
|---|---|---|---|---|---|---|---|---|---|
| | C | Mn | Si | Cr | Mo | V | W | Ni | Co |
| High Speed, Mo-base | .8 – 1.5 | .6 – 3 | .25 – 2.3 | 4 – 5 | 3.5 – 10 | 1 – 4 | 0 – 7 | – | 0 – 12 |
| High Speed, W-base | .7 – 1.5 | 3 | 2.3 | 4 – 5 | – | 1 – 5 | 12 – 20 | – | 0 – 12 |
| Hot Work, Cr-base | .2 – .6 | 3 | 2.3 | 3 – 7 | 0 – 5 | 0 – 2 | 0 – 7 | 0 – .3 | 0 – 5 |
| Hot Work W-base | .2 – .6 | 3 | 2.3 | 2 – 12 | – | 0 – 1 | 9 – 18 | – | – |
| Hot Work, Mo-base | .5 – .7 | 3 | 2.3 | 4 | 5 – 8 | 1 – 2 | 0 – 6 | – | – |
| Cold Work, C-Cr | 1 – 2.5 | 3 | 2.3 | 12 | 0 – 1 | 0 – 4 | – | – | 0 – 3 |
| Cold Work, Air Hardening | .5 – 2.5 | 3 | 2.3 | 0 – 5.5 | .1 – 1.5 | 0 – 5 | 0 – 1 | 0 – 2 | – |
| Cold Work, Oil Hardening | .9 – 1.5 | 3 | 2.3 | 0 – .8 | 0 – .3 | 0 – .4 | 0 – 1.8 | – | – |
| Shock Resisting | .4 – .6 | 3 | 2.3 | 0 – 3.5 | 0 – 1.5 | 0 | 0 – 2.5 | – | – |
| C-W Type | 1 – 1.5 | 3 | 2.3 | 0 – 1 | – | – | 0 – 4 | – | – |

Our new electrode is characterized by small fast globular metal transfer with low spatter levels when used in the short-circuiting arc welding process. It may also be made to operate with a quiet spray-like transfer when used in the so-called spray mode with higher current density. The small amount of slag is easily removed and the bead contour is smooth. Good tie-in of weld metal to base material and superior weld metal soundness are obtained.

As is well known in the art, a source of ions of the elements in Group 1A of the periodic chart, for example potassium, assists in stabilizing the welding arc. To be useful in our electrode, such source must provide ions in a form which does not also add components with adverse effects on rehydration properties of the core or on welding operation. We have found that potassium titanate is a suitable material for this use, as is potassium-bearing frit; a frit which we have used successfully has the following listed typical composition by weight: 18 per cent manganese oxide, 16 per cent silicon dioxide, 41 per cent titanium dioxide, 25 per cent potassium oxide. Also, several of our preferred fluxing agents, e.g., lithium fluoride, sodium fluoride and potassium silicofluoride, act both as fluxing agents and as sources of the desirable Group 1A ions.

Table 1 lists six examples of combinations of non-

TABLE 1
All percentages are by weight of the electrode

| Example | 1 | 2 | 3 | 4 | 5 | 6 |
|---|---|---|---|---|---|---|
| Fluxing Agent, Per Cent: | | | | | | |
| Lithium Fluoride | .12 | | .12 | .12 | | .12 |
| Potassium Silicofluoride | .12 | | | | | .12 |
| Sodium Silicofluoride | .12 | | | | | |
| Cryolite | | | .12 | | .12 | |
| Total | .36 | .12 | .12 | .12 | .12 | .24 |
| Slag Former, Per Cent: | | | | | | |
| Rutile | | .96 | | | .96 | |
| Sodium Feldspar | | .12 | | | .12 | |
| Zirconium Silicate | | .12 | | | .12 | |
| Wollastonite | | .12 | | | .24 | |
| Magnesium Oxide | | | | | .36 | |
| Calcium Carbonate | .024 | | .024 | .024 | | .024 |
| Total | .024 | 1.32 | .024 | .024 | 1.80 | .024 |
| Arc Stabilizer, Per Cent: | | | | | | |
| Potassium Titanate | .012 | | | .012 | | .012 | metallic ingredients that we have found useful in our electrode. Example 4 in the table is an especially preferred combination, and in addition to the listed non-metallics therein, we may use up to 0.5 per cent of slag former selected from oxide of manganese and potassium permanganate for minimizing slag inclusions in the weld metal.

We have found it convenient to have the core of our electrode constitute from about 10 to about 15 per cent of the electrode weight when the electrode is balanced to produce a mild, low-alloy or tool steel deposit, although as above stated, e.g., for producing the higher alloyed grades of tool steel, other core percentages can be used equally satisfactorily provided only that the electrode contains the required ingredients in the amounts specified.

Table 2 lists the metallic composition of seven of our electrodes designed for depositing the indicated low-alloy or tool steels. Note that the balance of each electrode consists of iron plus non-metallic components selected from the six examples listed in Table 1. Table 3 lists the typical chemical analysis of undiluted weld metal deposited by short-circuiting arc welding with a 0.045-inch diameter sample of each electrode of Table 2, using 75 per cent argon-25 per cent $CO_2$ shielding gas at 35 cubic feet per hour and typically 160 amps, 16 volts DC reverse polarity for the low-alloy electrodes and 54 per cent argon-29 per cent helium-17 per cent $CO_2$ shielding gas and 140 amps, 17.5 volts DC reverse polarity for the tool steel electrode. This deposit chemistry is typical for the listed metallic electrode composition in each case, although minor variations may occur depending on the specific combination of fluxing agent, slag former and arc stabilizer components selected from Table 1 to go into the electrode.

In manufacturing our electrode we size the granular core materials to minus 30 U.S. mesh before placing them within the sheath; after forming to a larger size we cold reduce the tubular electrode to 1/16-inch or

TABLE 2.—TUBULAR ELECTRODE METALLIC COMPOSITION PERCENTAGES ARE BY WEIGHT

| Electrode number | 1 | 2 | 3 | 4 | 5 | 6 | 7 |
|---|---|---|---|---|---|---|---|
| Steel type | Low-alloy 3 percent Ni | Low alloy Mn-Cr-Ni-Mo | Low-alloy Mn-Ni-Mo | Low-alloy C-Mo | Low-alloy Mn-Mo | Low-alloy Low C Cr-Mo | Tool. Air hardening. |
| Sheath metal | Mild steel [a] | Mild steel | Mild steel | Mild steel | Mild steel | Low C Mild steel [b] | Mild steel. |
| Electrode composition, percent | [c] | | | | | | |
| Carbon: From sheath plus alloys | .06 | .08 | .08 | .09 | .08 | .03 | .9 |
| Manganese: | | | | | | | |
| From electrolytic Mn | .5 | | | | | .5 | |
| From 1.4% C FeMn | | 1.5 | 1.5 | .5 | 1.5 | | 1.3 |
| From sheath | .3 | .3 | .3 | .3 | .3 | .3 | .3 |
| Total | .8 | 1.8 | 1.8 | .8 .9 | 1.8 | .8 | 1.6 |
| Silicon: | | | | | | | |
| From 50% FeSi | .8 | .9 | .7 | .8 | .8 | .9 | .2 |
| From Si carbide | | | | | | | .4 |
| Total | .8 | .9 | .7 | .8 | .8 | .9 | .6 |
| Nickel: From Ni powder | 3.5 | 2.4 | 2.4 | | | | |
| Chromium: | | | | | | | |
| From electrolytic Cr | | | | | | 2.4 | .6 |
| From low C FeCr | | .3 | | | | | |
| From high C FeCr | | | | | | | 4.8 |
| Total | | .3 | | | | 2.4 | 5.4 |
| Molybdenum: | | | | | | | |
| From FeMo | | .15 | .4 | .5 | .35 | 1.1 | |
| From Mo powder | | | | | | | 1.5 |
| Vanadium: From V carbide | | | | | | | .4 |
| Iron plus nonmetallics | Bal. | Bal. | Bal. | Bal. | Bal. | Bal. | Bal. |

[a] Mild steel typically contains .07 percent C, .3 percent Mn, less than .1 percent Si, balance essentially iron plus incidental impurities.
[b] Low carbon mild steel typically contains .01 percent C, .3 percent Mn, less than .1 percent Si, balance essentially iron plus incidental impurities.
[c] We may optionally also add .1 to .7 percent magnesium for increased deposit toughness.

TABLE 3
Typical Weld Deposit Analyses, Per Cent by Weight

| Electrode No. (From Table 2) | 1 | 2 | 3 | 4 | 5 | 6 | 7 |
|---|---|---|---|---|---|---|---|
| C | .04 | .06 | .04 | .08 | .07 | .03 | .7 |
| Mn | .65 | 1.4 | 1.3 | .75 | 1.7 | .7 | 1.2 |
| Si | .7 | .7 | .5 | .5 | .6 | .7 | .5 |
| Ni | 3.4 | 2.4 | 2.3 | — | — | — | — |
| Cr | — | .2 | — | — | — | 2.2 | 5.1 |
| Mo | — | .15 | .4 | .5 | .3 | 1.1 | 1.3 |
| V | — | — | — | — | — | — | .3 |
| Fe plus incidental impurities | Bal. | Bal. | Bal. | Bal. | Bal. | Bal. | Bal. | smaller diameter, as desired, at which size it is suitable for short-circuiting arc welding.

Our electrode is useful over a wide range of semiautomatic and automatic welding conditions including not only those of short-circuiting arc welding, for which it is especially adapted, but also those of spray transfer gas-shielded metal-arc welding. We have used embodiments of the electrode at from 60 to 300 amps (DC Reverse Polarity) and from 14 to 30 volts depending on the mode of transfer desired.

While we have described certain preferred embodiments of the invention and a present preferred method of practicing the same, it is to be distinctly understood that the invention is not limited thereto but may be otherwise variously embodied and practiced within the scope of the following claims.

We claim:

1. A bare continuous tubular electrode for use in gas-shielded arc welding of mild and low alloy steels consisting of a metallic outer sheath and a core within and enclosed by the sheath, the electrode consisting essentially of, by weight:
    0.05 to 0.36 percent of at least one fluxing agent selected from the group consisting of lithium fluoride, cryolite, potassium silicofluoride and sodium silico-fluoride;
    0.01 to 1.8 percent in total of slag former selected from the group consisting of titanium dioxide, potassium permanganate, sodium feldspar, zirconium silicate, calcium silicate, magnesium oxide, manganese oxide and calcium carbonate, but no more than 1.2 percent of any individual slag former;
    0 to 0.012 percent of arc stabilizer comprising potassium titanate;
    the balance of the electrode being metal-bearing material;
    said metal-bearing material containing, by weight of the electrode, 1.5 to about 10 percent alloying ingredients and deoxidizer, said alloying ingredients and deoxidizer comprising .6 to 1.8 percent manganese and 0.25 to 0.9 percent silicon, the balance of the metal-bearing material being essentially iron.

2. A bare continuous tubular electrode as claimed in claim 1 in which the fluxing agent comprises .12 per cent cryolite and the slag former includes titanium dioxide, sodium feldspar, zirconium silicate and calcium silicate.

3. A bare continuous tubular electrode as claimed in claim 2 which contains up to 0.2 per cent carbon, 0 to 4 per cent nickel, 0 to 6 per cent chromium and 0 to 1.3 per cent molybdenum.

4. A bare continuous tubular electrode as claimed in claim 1 in which the fluxing agent is selected from lithium fluoride, potassium silicofluoride and sodium silicofluoride and the slag former comprises 0.024 per cent calcium carbonate.

5. A bare continuous tubular electrode as claimed in claim 4 which contains up to .2 per cent carbon, 0 to 4 per cent nickel, 0 to 6 per cent chromium and 0 to 1.3 per cent molybdenum.

* * * * *

UNITED STATES PATENT OFFICE
CERTIFICATE OF CORRECTION

Patent No. 3,787,658              Dated January 22, 1974

Inventor(s) Paul A. Kammer and Robert B. Duttera

It is certified that error appears in the above-identified patent and that said Letters Patent are hereby corrected as shown below:

Column 4, line 30, change "e.g." to --i.e.--. In the table in column 6, rewrite the second and third columns as follows:

| Mn | Si |
|---|---|
| .6-3 | .25-2.3 |
| " | " |
| " | " |
| " | " |
| " | " |
| " | " |
| " | " |
| " | " |
| " | " |
| " | " |

In Table 2, line 10, between columns 4 and 5, cancel "9".

Signed and sealed this 23rd day of April 1974.

(SEAL)
Attest:

EDWARD M. FLETCHER, JR.
Attesting Officer

C. MARSHALL DANN
Commissioner of Patents